UNITED STATES PATENT OFFICE.

WILLIAM L. O'BRYANT, OF REPUBLIC, MISSOURI.

COMPOUND.

973,549.  Specification of Letters Patent.  Patented Oct. 25, 1910.

No Drawing.  Application filed December 4, 1909.  Serial No. 531,359.

*To all whom it may concern:*

Be it known that I, WILLIAM L. O'BRYANT, a citizen of the United States of America, residing at Republic, in the county of Greene and State of Missouri, have invented certain new and useful Improvements in Compounds, of which the following is a specification.

This invention relates to the subject of bait for fishes and the like, and the principal object of the same is to provide a bait that will be pleasing to the taste and which will emit an odor that will attract the fish.

In carrying out the objects of the invention generally stated above it will be understood, of course, that the proportions of the ingredients hereinafter mentioned may be varied and in some instances, some of the ingredients may be omitted, but a practical and entirely satisfactory bait has been produced by using the following ingredients in the proportion specified:—Powdered asafetida, 11 lbs.; powdered Saigon cinnamon, 7 lbs.; oil anise, 2 lbs.; oil amber, 3 lbs.; oil rhodium, 2 lbs.; celery seed, 3 lbs.; sugar, 15 lbs.; salt, 25 lbs.; shorts (low grade flour), 100 lbs.; fennel, 3 lbs.

The above mentioned ingredients are thoroughly and intimately mixed in any suitable manner, and form a bait particles of which may be readily attached to an ordinary fish hook, or the bait may be used in connection with traps so that the fish will be attracted thereby and be caused to enter the trap.

What I claim as my invention is:—

1. A bait composed of an intimate mixture of asafetida, Saigon cinnamon, anise oil, amber oil, rhodium oil, celery seed, sugar, salt, short and fennel.

2. A bait composed of powdered asafetida, powdered Saigon cinnamon, anise oil, amber oil, rhodium oil, celery seed, sugar, salt, flour, and fennel.

In testimony whereof I hereunto affix my signature in presence of two witnesses.

WILLIAM L. O'BRYANT.

Witnesses:
WM. H. HORINE,
ROBT. H. WALKER.